United States Patent
Boskamp et al.

(10) Patent No.: US 11,342,584 B2
(45) Date of Patent: May 24, 2022

(54) SOLVENT-FREE SOLID ELECTROLYTE

(71) Applicant: Forschungszentrum Juelich GmbH, Juelich (DE)

(72) Inventors: Laura Boskamp, Bremen (DE); Gunther Brunklaus, Muenster (DE); Isidora Cekic-Laskovic, Muenster (DE); Martin Winter, Muenster (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 267 days.

(21) Appl. No.: 16/650,874

(22) PCT Filed: Sep. 28, 2018

(86) PCT No.: PCT/DE2018/000278
§ 371 (c)(1),
(2) Date: Mar. 26, 2020

(87) PCT Pub. No.: WO2019/080950
PCT Pub. Date: May 2, 2019

(65) Prior Publication Data
US 2020/0227783 A1 Jul. 16, 2020

(30) Foreign Application Priority Data
Oct. 27, 2017 (DE) .................. 10 2017 010 000.4

(51) Int. Cl.
*H01M 10/0565* (2010.01)
*C08B 37/16* (2006.01)
(Continued)

(52) U.S. Cl.
CPC ..... *H01M 10/0565* (2013.01); *C08B 37/0015* (2013.01); *C08G 83/007* (2013.01);
(Continued)

(58) Field of Classification Search
CPC ......... H01M 10/0565; H01M 10/0525; H01M 2300/0082; H01M 10/052; C08B 37/0015;
(Continued)

(56) References Cited

U.S. PATENT DOCUMENTS

| 5,110,694 A | 5/1992 | Distefano et al. |
| 5,531,871 A | 7/1996 | Fauteux et al. |
| 2019/0051905 A1* | 2/2019 | Zhamu .................. H01M 4/525 |

FOREIGN PATENT DOCUMENTS

| CN | 107195965 A | 9/2017 |
| DE | 69505254 T2 | 7/1999 |

OTHER PUBLICATIONS

Yang, et al., "Transferring Lithium Ions in Nanochannels: A PEO/Li + Solid Polymer Electrolyte Design," *Angewandte Chemie International Edition* 53, 14: 3631-3635 (Mar. 5, 2014). XP055529557.
(Continued)

*Primary Examiner* — Gary D Harris
(74) *Attorney, Agent, or Firm* — Leydig, Voit & Mayer, Ltd.

(57) ABSTRACT

A solvent-free polymer electrolyte having a polymer matrix which is conductive for lithium ions and a lithium salt, wherein the polymer matrix has at least one pseudo-polyrotaxane which includes at least one linear polymer and at least one ring-shaped molecule, and wherein the lithium salt is arranged in the polymer matrix and is at least partially chemically bonded to the polymer matrix, wherein the polymer matrix includes at least one pseudo-polyrotaxane with at least one completely or partially chemically modified cyclodextrin or at least one completely or partially chemically modified crown ether, in which the present hydroxyl groups of the cyclodextrin, or the scaffold of the crown ether, are/is partly or completely modified by functional groups, wherein the functional groups comprise alkyl, aryl, alkenyl,
(Continued)

alkynyl groups ($C_n$, with n≤5), or other short-chain polymer groups having up to 20 repeating units.

12 Claims, 5 Drawing Sheets

(51) Int. Cl.
    *C08G 83/00*     (2006.01)
    *C08L 5/16*     (2006.01)
    *H01M 10/0525*     (2010.01)

(52) U.S. Cl.
    CPC ........... *C08L 5/16* (2013.01); *H01M 10/0525* (2013.01); *H01M 2300/0082* (2013.01)

(58) Field of Classification Search
    CPC ......... C08G 83/007; C08L 5/16; Y02E 60/10; C08J 5/20
    USPC ........................................................ 429/188
    See application file for complete search history.

(56) References Cited

OTHER PUBLICATIONS

Imholt, et al., "Supramolecular Self-Assembly of Methylated Rotaxanes for Solid Polymer Electrolyte Application," *ACS Macro Letters* 7, 7: 881-885 (Jul. 5, 2018). XP055529982.

Imholt, et al., "Grafted Polyrotaxanes as Highly Conductive Electrolytes for Lithium Metal Batteries," *Journal of Power Sources* 409: 148-158 (Aug. 31, 2018). XP055529949.

Lin, et al., "Solid Polymer Electrolyte Based on Crosslinked Polyrotaxane,"*Polymer* 136: 121-127 (Dec. 27, 2017). XP055529992.

Karuppasamy, et al. "Headway in Rhodanide Anion Based Ternary Gel Polymer Electrolytes (TILGPEs) for Applications in Rechargeable Lithium Ion Batteries: an Efficient Route to Achieve High Electrochemical and Cycling Performances," *RSC Advances* 7: 19211-19222 (Mar. 2017).

Liu, et al., "Novel Gel Polymer Electrolyte for High-Performance Lithium-Sulfur Batteries," *Nano Energy* 22: 278-289 (Feb. 19, 2016).

Jankowsky, et al., "Enhanced Lithium-Ion Transport in Polyphosphazene Based Gel Polymer Electrolytes," *Electrochimica Acta* 155: 364-371 (Dec. 24, 2014).

Ma, et al., "Atomic-Scale Origin of the Large Grain-Boundary Resistance in Perovskite Li-Ion-Conducting Solid Electrolytes," *Energy & Environmental Science* 7: 1638-1642 (Mar. 2014).

Xue, et al., "Poly(ethylene Oxide)-Based Electrolytes for Lithium-Ion Batteries," *Journal of Materials Chemistry A* 3: 19218-19253 (Jul. 2015).

Han, et al., "A Comparative Study of Commercial Lithium Ion Battery Cycle Life in Electrical Vehicle: Aging Mechanism Identification," *Journal of Power Sources* 251: 38-54 (Nov. 23, 2013).

Zhang, et al., "Flexible and Ion-Conducting Membrane Electrolytes for Solid-State Lithium Batteries: Dispersion of Garnet Nanoparticles in Insulating Polyethylene Oxide," *Nano Energy* 28. 447-454 (Sep. 2, 2016).

Youcef, et al., "Cross-Linked Solid Polymer Electrolyte for All-Solid-State Rechargeable Lithium Batteries," *Electrochimica Acta* 220: 587-594 (Oct. 19, 2016).

Fu, et al., "Revealing Structure and Dynamics in Host-Guest Supramolecular Crystalline Polymer Electrolytes by Solid-State NMR: Applications to β-CD-Polyether/Li Crystal," *Polymer* 105: 310-317 (Oct. 19, 2016).

He, et al., "Carbonate-Linked Poly(ethylene Oxide) Polymer Electrolytes Towards High Performance Solid State Lithium Batteries," *Electrochimica Acta* 225: 151-159 (Dec. 21, 2016).

Osada, et al., "Ionic-Liquid-Based Polymer Electrolytes for Battery Applications," *Angewandte Chemie International Edition* 55: 500-513 (Dec. 2016).

Shim, et al., "All-Solid-State Lithium Metal Battery with Solid Polymer Electrolytes Based on Polysiloxane Crosslinked by Modified Natural Gallic Acid," *Polymer* 122: 222-231 (Jun. 27, 2017).

Wen, et al., "A Review on Lithium-Ion Batteries Safety Issues: Existing Problems and Possible Solutions," *Materials Express* 2, 3: 197-212 (Sep. 7, 2012).

Yue, et al., "All Solid-State Polymer Electrolytes for High-Performance Lithium Ion Batteries," *Energy Storage Materials* 5: 139-164 (Jul. 21, 2016).

Karuppasamy, et al., "Electrochemical and Cycling Performances of Novel Nonafluorobutanesulfonate (nonaflate) Ionic Liquid Based Ternary Gel Polymer Electrolyte Membranes for Rechargeable Lithium Ion Batteries," *Journal of Membrane Science* 514: 350-357 (May 10, 2016).

Zhao, et al., "A New Solid Polymer Electrolyte Incorporating Li10GeP2S12 into a Polyethylene Oxide Matrix for All-Solid-State Lithium Batteries," *Journal of Power Sources* 301: 47-53 (Oct. 9, 2015).

Muenchow, et al., "Poly[(Oligoethylene Glycol) Dihydroxytitanate] as Organic-Inorganic Polymer-Electrolytes," *Electrochimica Acta* 45: 1211-1221 (Apr. 1999).

Yang, et al., "Ionic Conductivity of β-Cyclodextrin-Polyethylene-Oxide/Alkali-Metal-Salt Complex," *Chemistry: A European Journal* 21: 6346-6349 (Mar. 10, 2015).

Yang, et al., "Ionic Conductivity of β-Cyclodextrin-Polyethylene-Oxide/Alkali-Metal-Salt Complex—Supporting Information," *Chemistry: A European Journal* 21 (Mar. 10, 2015).

Knauth, "Inorganic Solid Li Ion Conductors: An Overview," *Solid State Ionics* 180: 911-916 (Mar. 23, 2009).

Perea, et al., "Safety of Solid-State Li Metal Battery: Solid Polymer Versus Liquid Electrolyte," *Journal of Power Sources* 359: 182-185 (May 25, 2017).

Kaskhedikar, et al., "Polymer Electrolytes Based on Cross-Linked Cyclotriphosphazenes," *Solid State Ionics* 177: 3129-3134 (Aug. 18, 2006).

Mindemark, et al., "Allyl Ethers as Combined Plasticizing and Crosslinkable Side Groups in Polycarbonate-Based Polymer Electrolytes for Solid-State Li Batteries," *Journal of Polymer Science, Part A: Polymer Chemistry* 54: 2128-2135 (Mar. 6, 2016).

Tanaka, et al., "Lithium Ion Conductivity in Polyoxyethylene/ Polyethylenimine Blends," *Electrochimica Acta* 46: 1709-1715 (Oct. 12, 2000).

\* cited by examiner

SOLVENT-FREE SOLID ELECTROLYTE

CROSS REFERENCE TO PRIOR APPLICATIONS

This application is a U.S. National Phase application under 35 U.S.C. § 371 of International Application No. PCT/DE2018/000278, filed on Sep. 28, 2018, and claims benefit to German Patent Application No. 10 2017 010 000.4, filed on Oct. 27, 2017. The International Application was published in German on May 2, 2019 as WO 2019/080950 A1 under PCT Article 21(2).

FIELD

The invention relates to the field of commercial, rechargeable lithium-ion batteries, and in particular to dry, solvent-free solid electrolytes which can be used in such lithium-ion batteries. The invention relates in particular to a novel method for producing such an electrolyte and new lithium-ion secondary batteries.

BACKGROUND

Combustible liquid electrolytes are used in most commercial rechargeable lithium-ion batteries. Great disadvantages associated with these systems are firstly the high safety risk of the liquid electrolytes[1] and secondly the aging resistance of these electrolytes.[2,3] Research therefore increasingly proceeds in the direction of largely solvent-free solid-state batteries, in which the liquid electrolyte is replaced by polymer electrolyte, ceramic, or glass, for example.

The use of solvent-free solid electrolytes markedly increases the safety and aging resistance of the batteries. Inorganic ceramic solid electrolytes are distinguished by high conductivities but previously have not been technically applicable since the electrical resistance between electrolyte and cathode is often very high and the processing of such solid electrolytes is usually difficult, and sufficient stability with respect to lithium metal is also not ensured.[4,5]

In commercially available lithium-polymer batteries (LiPo), polymer polyethylene oxide (PEO) is frequently used[6], but the achievable ionic conductivity of PEO or PEO derivatives at room temperature is too low to achieve high performances.[7,8,9]

In many tasks, it is therefore sought to selectively increase the conductivity of the polymer electrolytes via chemical modifications of PEO, formation of copolymers, or use of other classes of polymer (polycarbonates, polysiloxanes, polyphosphazenes, etc.).[10,11,12,13]

Gel polymer electrolytes, in which it is sought to achieve higher ionic conductivities via addition (of up to 90% by weight) of ionic liquids[14,15] or liquid solvents[16,17], are already described in the literature.

In such instances, however, the discussion can no longer be of a pure solid electrolyte, and the safety risks and possible mechanical instabilities remain. In addition, the use of ionic liquids is presently still very cost-intensive and often not particularly environmentally friendly.[13]

In addition, it can be seen from the existing work that in particular cyclizations of electrochemical cells with lithium metal electrodes, which are very important for commercial use, still need to be considerably improved with regard to the achievable ionic conductivity (in the range of $10^{-8}$ to $10^{-6}$ S/cm at room temperature), the possibility of rapid charging capability and long-term stable cyclization with very high Coulombic efficiencies (charging efficiency calculated from the ratio of charging to discharging capacity).

Moreover, in many works, no dry, i.e., solvent-free, polymer electrolyte is used since appropriately high ionic conductivities ($10^{-3}$ to $10^{-2}$ S/cm) and necessary contact with the cathode can already be ensured by quite small proportions of liquid electrolyte. However, these proportions of the liquid electrolyte can significantly increase the safety risk in the medium term. Existing works in which only purely dry electrolytes are used predominantly utilize very slow charging and discharging currents (rates of <1 C) in order to achieve appropriate usable specific capacities.[10,18,19,20,21]

In the sense of future, area-covering electromobility, the rapid charging capability of batteries (at rates of ≥1 C) is of particular importance and is desirable in order to reasonably limit necessary stops at electric charging stations for electric cars. In addition, the battery should have constantly high specific capacities over as many charge and discharge cycles as possible in order to make these dry, predominantly safe polymer electrolytes usable for commercial applications.

Polyrotaxanes are supramolecular structures in which ring-shaped (cyclic) molecules are threaded on a linear polymer (see FIG. 1). Cyclodextrins are the best-known ring-shaped molecules that are used in these structures as host molecules. In addition to cyclodextrins, crown ethers and other macrocyclic molecules, such as pillar[n]arene with n=5 to 10, cucurbituril, or calix[n]arene with n=4 to 8 also have the property of threading onto a linear polymer. In the case of polyrotaxanes, a differentiation may be made between main-chain and side-chain polyrotaxanes. Pillar[n]arenes are macrocyclic molecules that are constructed from 1,4-hydroquinone units which are joined together in para-position. They are structurally similar to cucurbiturils and calixarenes, which play an important role in host/guest chemistry. Cucurbiturils are likewise macrocyclic molecules that are constructed from glycoluril ($=C_4H_2N_4O_2=$) monomer units that are connected by methylene bridges ($—CH_2—$) and have oxygen atoms at the edges. They form partially closed cavities. Calix[n]arene is likewise a macrocyclic molecule or cyclic oligomer based on a hydroxyalkylation product of a phenol and an aldehyde with n=4 to 8.

At the ends, the linear polymer chains may preferably have sterically discriminating "stoppers" that prevent the ring-shaped molecules from sliding off the linear polymer. Suitable stoppers to be considered are in this case in particular bulky, voluminous functional groups which modify the linear polymer at the ends. In this form, the linear polymer chains thus resemble barbells.

Cyclodextrins are a class of compounds belonging to the cyclic oligosaccharides. They represent ring-shaped degradation products of starch. They consist of α-1,4-glycosidically linked glucose molecules. This results in a toroidal structure with a central cavity.

The cyclodextrins are named differently depending on the number of glucose units from which they are built (see FIG. 2). A Greek letter as a prefix is used to distinguish:
α-cyclodextrin: n=6 glucose molecules (cavity diameter/height: 4.7 . . . 5.3/7.9 Å)
β-cyclodextrin: n=7 glucose molecules (cavity diameter/height: 6.0 . . . 6.5/7.9 Å)
γ-cyclodextrin: n=8 glucose molecules (cavity diameter/height: 7.5 . . . 8.3/7.9 Å)

No covalent interactions are prevalent between the polymer and the cyclodextrin in this case. However, the hydrophobic character of the internal space of the cyclodextrins offers an energetic advantage for the hydrophobic polymer as compared to hydrophilic water molecules. As soon as cyclodextrins dissolved in water are present, hydrophilic water molecules are always found in the hydrophobic cavity of the cyclodextrins, which is rather disadvantageous in terms of energy. Then, if a hydrophobic polymer is added, the water molecules are displaced from the cavity and energy is released.

Since the cyclodextrins are made up of glucose molecules, they have many hydroxyl groups, whereby a plurality of stabilizing hydrogen bridge bonds may form between the respective cyclodextrins. These may be formed both within the cyclodextrin ring and between adjacently arranged cyclodextrins on a polymer chain, or else between two cyclodextrins of adjacent polymer chains. This typically results in more or less rigid, directed "tubes" or channels (FIG. 3, left).

Polyrotaxanes and pseudo-polyrotaxanes (rotaxanes without stoppers) were studied individually for use as an electrolyte, wherein a faster transport of the lithium ions is ensured by the special structure of the cyclodextrin channels, and thus high ionic conductivities should be achieved. However, the ionic conductivity achievable in previously known systems is still significantly too low (typically in the range of $10^{-7}$-$10^{-5}$ S cm$^{-1}$ at 60° C.) in order to be able to therewith implement electrochemical cyclization.[22,23,24]

SUMMARY

A solvent-free polymer electrolyte for use in a rechargeable lithium-ion secondary battery, comprising: a polymer matrix which is conductive for lithium ions and a lithium salt, wherein the polymer matrix has at least one pseudo-polyrotaxane which comprises at least one linear polymer and at least one ring-shaped molecule, and wherein the lithium salt is arranged in the polymer matrix and is at least partially chemically bonded to the polymer matrix, wherein the polymer matrix comprises at least one pseudo-polyrotaxane with at least one completely or partially chemically modified cyclodextrin in which the present hydroxyl groups of the cyclodextrin are partly or completely modified by functional groups, or at least one completely or partially chemically modified crown ether in which the scaffold of the crown ether is partially or completely modified by functional groups, wherein the functional groups comprise alkyl, aryl, alkenyl, alkynyl groups (Cn, with n≤5), or other short-chain polymer groups having up to 20 repeating units.

DETAILED DESCRIPTION

Figure 1:
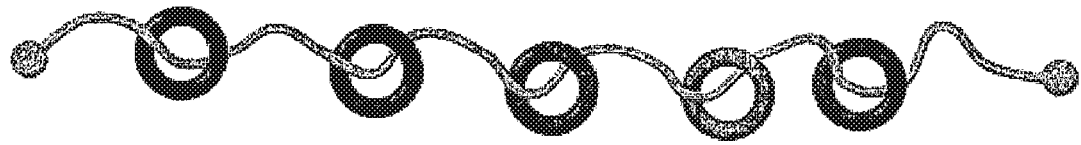
FIG. 1: schematic representation of the structure of a polyrotaxane:
Top: a main-chain polyrotaxane with "stoppers" at both ends,
Bottom: a side-chain polyrotaxane.

In an embodiment, the present invention provides a novel dry, i.e., solvent-free, solid electrolyte for applications in lithium-ion batteries, which overcomes the previous disadvantages from the prior art, in particular low ionic conductivity, and has an ionic conductivity of at least $10^{-4}$ S/cm at room temperature. Furthermore, the solid electrolyte should preferably have an increased lithium ion conductivity, wherein the lithium ion conductivity represents the proportion of the conductivity which results only from the lithium ions. The lithium ion conductivity is routinely indicated by the transference number, which should optimally assume a value of 1, which means that 100% of the conductivity results from the movement of the lithium ions.

Furthermore, another embodiment provides a corresponding production method for such a novel dry solid electrolyte.

Furthermore, another embodiment provides an improved lithium-ion secondary battery which has improved conductivity and improved long-term stability.

It has been found that chemically modified polyrotaxanes are advantageously suitable for use as dry solid electrolytes, i.e., as solvent-free polymer electrolytes, for lithium-ion batteries.

Polyrotaxanes are supramolecular structures in which ring-shaped molecules, such as wheels, are threaded on a linear, chain-shaped polymer as an axis. Cyclodextrins and crown ethers are the best-known ring-shaped molecules that have previously been used as wheels in these structures. Ring and chain molecules are in this case connected to one another mechanically but not covalently. According to an embodiment of the invention, only main-chain polyrotaxanes are encompassed.

However, due to the aforementioned intermolecular and intramolecular interactions, the aforementioned structures are disadvantageously too rigid to allow a rapid lithium ion transport.

In an embodiment of the present invention, polyrotaxanes that have previously been used have therefore been specifically chemically modified in order to reduce the intermolecular and intramolecular hydrogen bridge bonds of the formed complexes, which otherwise are created by the hydroxyl groups. This has the effect that less crystalline (rigid) materials are obtained.

The modification according to certain embodiments of the invention in this case relates to the ring-shaped molecules of the polyrotaxanes, in particular the previously used cyclodextrins, as well as to the crown ether and other macrocyclic molecules, such as pillar[n]arene with n=5 to 10, cucurbituril, or calix[n]arene with n=4 to 8.

According to certain embodiments of the invention, the hydroxyl groups of the cyclodextrins are partially or completely replaced (modified) by other functional groups, such as alkyl, aryl, alkenyl or alkynyl groups, or else short-chain polymer groups (i.e., chains having up to 20 repeating units). For example, methyl groups or else a polycaprolactone group would be a suitable modification of the present hydroxyl groups in the sense of the present invention.

In the case of crown ethers, the modification takes place at the scaffold in which the functional groups, such as alkyl, aryl, alkenyl or alkynyl groups or else short-chain polymer groups (i.e., chains with up to 20 repeating units), are covalently incorporated.

It has been found that what are known as single ion conductors are suitable for increasing the lithium conductivity, in which single ion conductors the anion of the added lithium salt is advantageously chemically bonded to the lateral polymer chains and as a result makes no or only a small contribution to the ionic conductivity.

The anion of the added lithium salt and the polymeric side group are in this case modified in such a way that both may react with one another and the anion is thus chemically bonded to the side group.

In particular, the concept of click chemistry is in this case applied, in which efficient, stereospecific, environmentally friendly reactions take place in high yields.

In a specific embodiment, the concept of the thiolene click reaction may be applied, in which the polymeric side group is provided with an allyl group while the anion of the added lithium salt contains a thiol group. Using temperature and/or UV light and in the presence of an initiator, the thiolene click reactions can proceed in a targeted manner.

In order to improve the transference number, the anion of the added lithium salt is chemically bonded according to certain embodiments of the invention to the polymer side groups so that single ion conductors are produced for which the lithium ion represents the only mobile species.

The transference number indicates the fraction of the total electrical current that is transported by only the cations (lithium ions) and may assume values between 0 and 1. It is measured in a symmetrical lithium/polymer electrolyte/lithium cell structure.

The cyclodextrin molecules modified according to certain embodiments of the invention advantageously have fewer chemical interactions with one another, wherein the ratio of cyclodextrin to polymer is normally also altered. In particular, this modification produces the effect that the modified cyclodextrins threaded on the linear polymer chains regularly have a greater distance from one another than the unmodified cyclodextrins (see FIG. 2).

In certain embodiments, α-cyclodextrins, β-cyclodextrins and γ-cyclodextrins may be used in modified form. Mixtures of these cyclodextrins are also possible and are suitable within the scope of this invention.

In this way, the entire supramolecular structure is altered, and the individually formed channels or tubes are less rigid. These more flexible structures in turn advantageously enable a faster lithium ion transport.

In addition to chemical modification, in a particular embodiment, the polyrotaxanes modified according to an embodiment of the invention also have linear polymer chains whose ends at least in part have bulky, voluminous end groups, which advantageously prevent the ring-shaped molecules from slipping off the linear polymer chains.

Such a bulky end group may, for example, be obtained in that the linear polymer chains that are used have at their ends at least partially functional groups which may be polymerized and thus lead to bulky, voluminous end groups.

Experimental trials have moreover shown that, in the complexes based on modified cyclodextrins, the proportion of lithium ions outside of the formed channels is greater than in complexes that are based on unmodified cyclodextrins.

These findings can also be confirmed by first computer simulations. This means that, in certain embodiments of the present invention, the main mechanism of lithium ion transport is likely to be based on the fact that the lithium ions outside of the formed polyrotaxane channel structure are transported along the functional groups of the modified cyclodextrins and not, as described in the known literature, within the channels along the polymer.

In addition, the modification according to certain embodiments of the invention improves the coordination of the lithium ions to the cyclic cyclodextrin molecule and thus favorably influences or optimizes the transport of the lithium ions along the modified cyclodextrins.

The production of such modified polyrotaxanes is relatively simple to bring about. Cyclodextrins are degradation products of starch and therefore very inexpensive, environmentally friendly starting materials. The modification of the cyclodextrins and the production of the polyrotaxanes can also be realized via simple, favorable, and readily scalable syntheses.

As a result, a dry, i.e., solvent-free, polymer electrolyte is proposed for use in chargeable lithium secondary batteries, which electrolyte comprises a lithium ion-conductive polymer matrix and a lithium salt, which lithium salt is dispersed in the polymer matrix and at least partially chemically bound by the polymer matrix.

The polymer electrolyte according to certain embodiments of the present invention is a solvent-free electrolyte having a lithium ion-conducting polymer matrix comprising at least one polyrotaxane comprising at least one linear polymer, and additionally ring-shaped molecules, such as modified cyclodextrin and/or crown ethers arranged around the linear polymer.

The linear, chain-shaped polymer may in particular be polyethylene oxide (PEO) or PEO derivatives. The molecular weight of the linear molecule is between 500 and 10,000 g/mol, particularly preferably between 1000 and 3000 g/mol.

According to certain embodiments of the invention, the ring-shaped molecules are completely or partially chemically modified cyclodextrins and/or crown ethers. What is to be understood by this is that the present hydroxyl groups of the ring-shaped molecules are partially or completely modified with functional groups, such as alkyl, aryl, alkenyl, alkynyl groups ($C_n$, with $n \leq 5$) or else short-chain polymer groups (meaning chains having up to 20 repeating units).

Suitable as a lithium salt are, in particular, the following lithium salts for use in the polymer electrolyte according to certain embodiments of the invention:
Lithium perchlorate ($LiClO_4$),
Lithium hexafluorophosphate ($LiPF_6$),
Lithium tetrafluoroborate ($LiBF_4$),
Lithium hexafluoroarsenate(V) ($LiAsF_6$),
Lithium trifluoromethanesulfonate ($LiCF_3SO_3$),
Lithium bis-trifluoromethyl sulfonylimide ($LiN(CF_3SO_2)_3$),
Lithium bis(oxalato)borate (LiBOB),
Lithium oxalyldifluoroborate ($LiBF_2C_2O_4$),
Lithium nitrate ($LiNO_3$),
Li-fluoroalkyl phosphate ($LiPF_3(CF_2CF_3)_3$),
Lithium bisperfluoroethysulfonylimide (LiBETI),
Lithium bis(trifluoromethanesulphonyl)imide,
Lithium bis(fluorosulphonyl)imide,
Lithium trifluoromethanesulfonimide (LiTFSI),
or any combination of these salts.

According to certain embodiments of the invention, the ratio of repeating units of the polymer to salt is 3:1 to 20:1.

In an embodiment of the polymer electrolyte, the electrolyte may also have additional additives in addition to the polymer matrix. These additives are present outside of the polyrotaxane structure and are not enclosed in the cyclodextrin or crown ether.

The additives may serve for improved film formation or for greater mechanical stability of the polymer film. Additives of up to 5% by weight relative to the polyrotaxane may typically be used.

To be mentioned in particular as additives suitable in the sense of the invention are:
Polypropylene oxide (PPO),
Polyacrylonitrile (PAN),
Polymethyl methacrylate (PMMA),
Polyvinylidene difluoride (PVDF),
Polyvinyl chloride (PVC),
Polydimethylsiloxane (PDMS), and
Polyvinylidene difluoride hexafluoropropylene (PVDF-HFP),
as well as a derivative thereof and/or any combination of these additives.

Polyethylene oxide (PEO) may also be added as additive. In this case, however, the PEO no longer threads but rather serves as an additive, for example for better film formation.

These additives may preferably be used with a weight fraction of >0 to 5% by weight relative to the polyrotaxane.

The chemically modified systems according to certain embodiments of the invention exhibit greatly increased ionic conductivities, in particular at room temperature, due to the aforementioned structural changes. A great increase in this case means an improvement by at least 3 orders of magnitude as compared with the previous prior art.

Furthermore, the chemically modified systems according to certain embodiments of the invention exhibit improved electrochemical stability, wherein the stable long-term cyclization, which is absolutely necessary for industrial application, may also be reproducibly realized by means of the newly developed dry polymer electrolytes in lithium/LiFePO$_4$ cells at high charging and discharging currents ($\geq 1$ C). Cyclization of a battery includes a charging and discharging process, meaning when a certain amount of energy has been loaded into the storage and removed therefrom again.

In a particular embodiment of the invention, the linear polymers have on at least one end one or more functional groups which can likewise be polymerized and as a result form particularly bulky, voluminous end groups.

As a novel substance class for use as dry polymer electrolyte, the modified polyrotaxanes provided according to certain embodiments of the invention exhibit particular advantages in the rapid charging capability and in addition high conductivity in energy storage systems, in particular in lithium-ion batteries.

This new class of materials may additionally be used as a binder in cathodes and anodes, as an additive in a liquid electrolyte, as a gel polymer electrolyte, as solid-state batteries with polymer-coated anodes and cathodes, as separators in multilayer systems, and in various polymer combinations, such as block copolymers.

As a novel material class, however, the modified polyrotaxanes provided according to certain embodiments of the invention are not restricted only to use as an electrolyte but rather may generally be used in a multilayer system in which individual layers consisting of different materials are combined with one another so that the positive properties of the individual layers are advantageously combined with one another.

EXAMPLES

Certain aspects of the invention are explained in more detail in the following using exemplary embodiments, figures, and tables, without this limiting the broad scope of protection.

Figure 2:
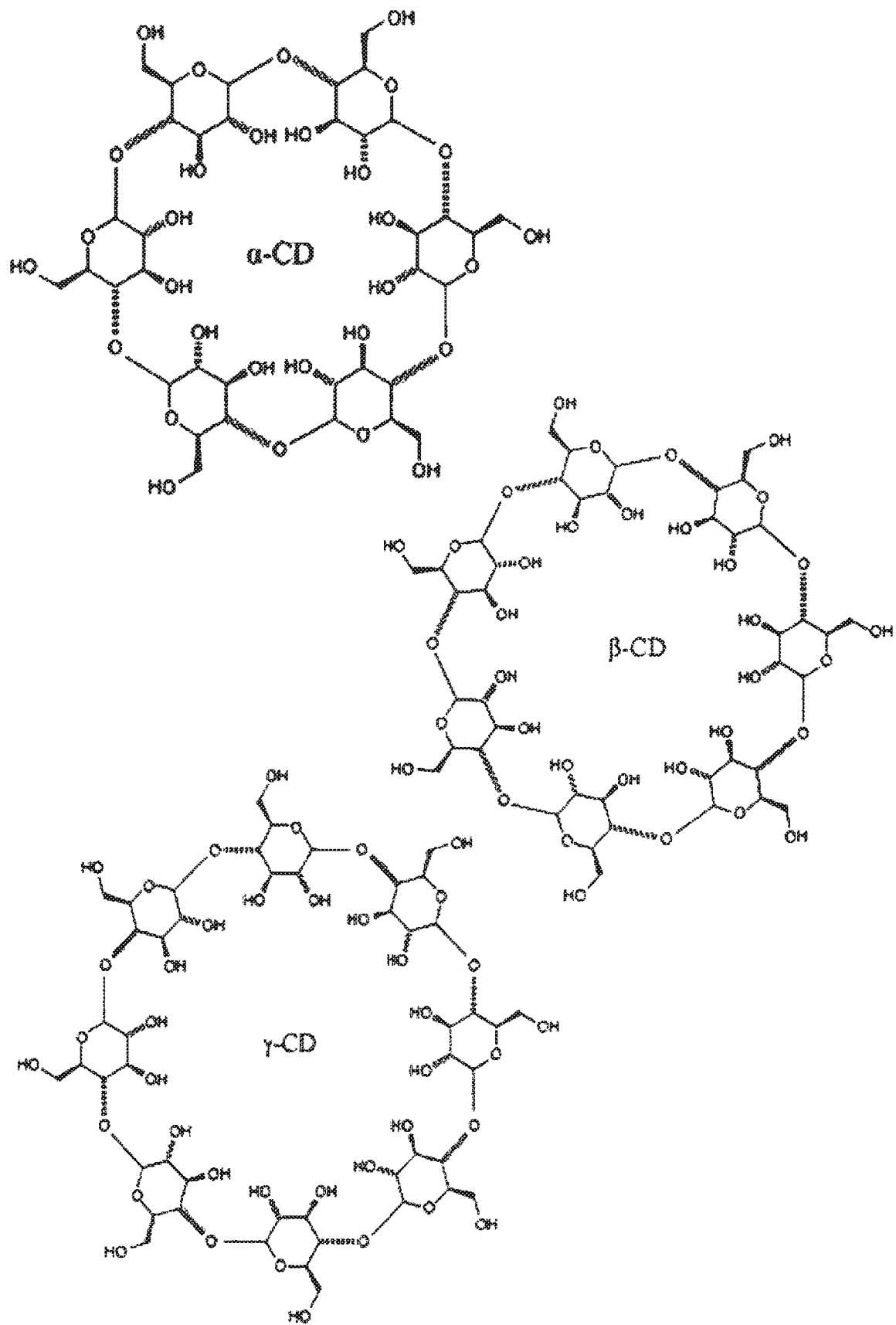
FIG. 2: modifications of cyclodextrins.
Figure 3:
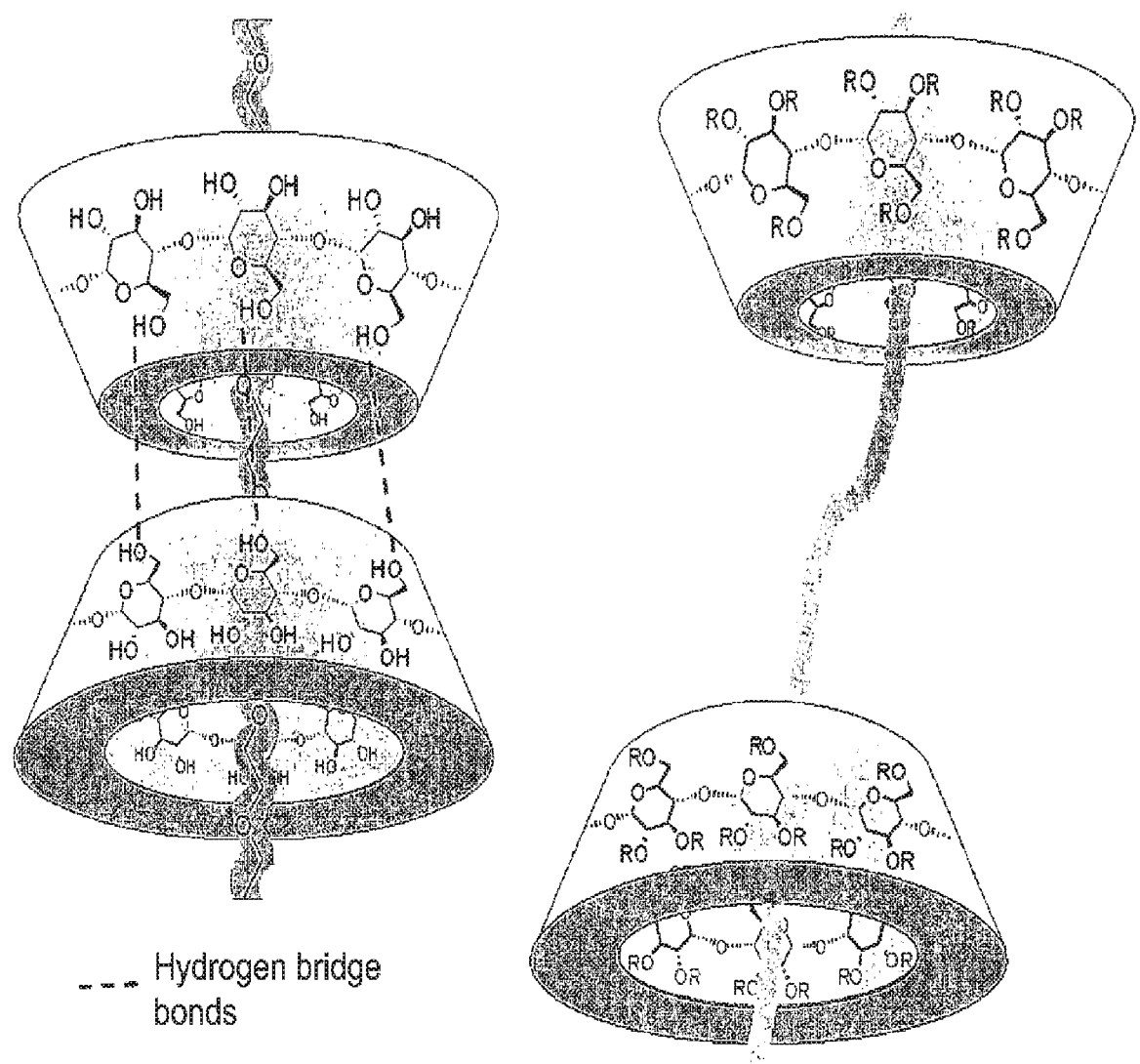
FIG. 3: comparison of the structures of an unmodified polyrotaxane (left) and a polyrotaxane modified according to an embodiment of the invention (right).
Figure 4:
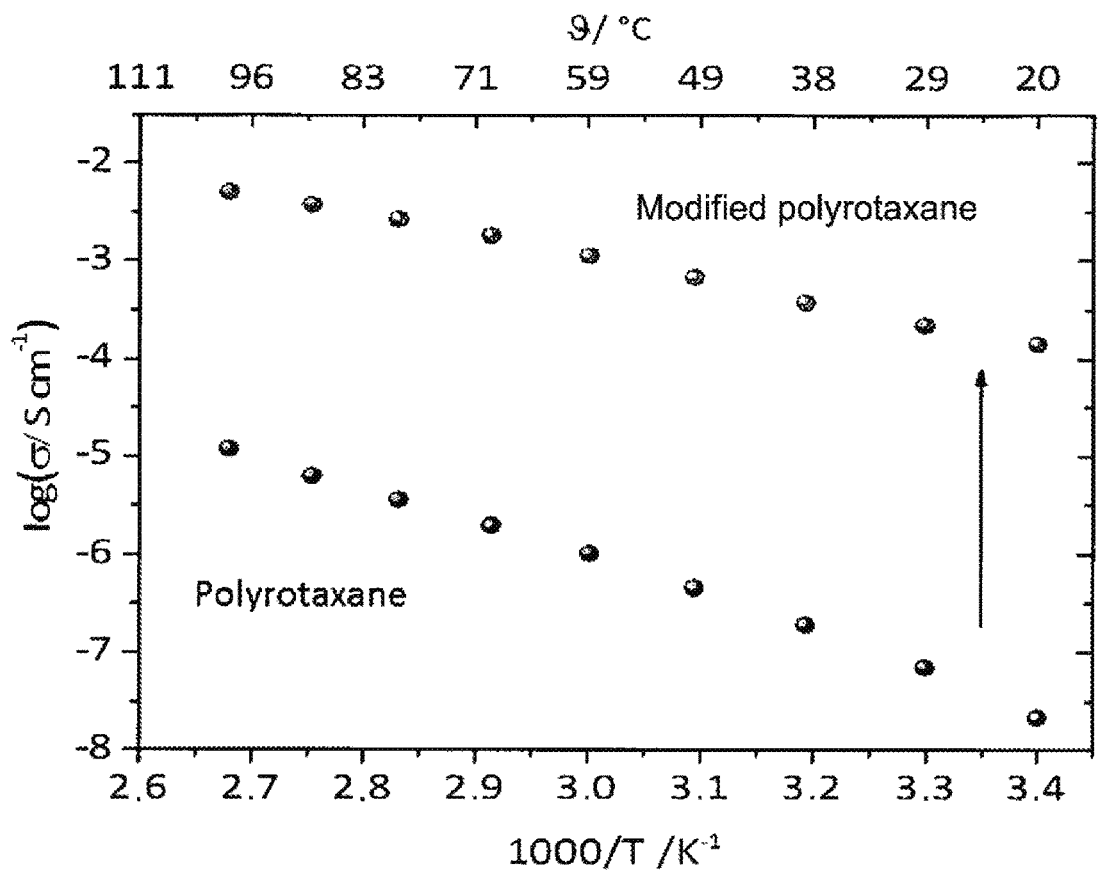
FIG. 4: conductivity measurements.
Figure 5:
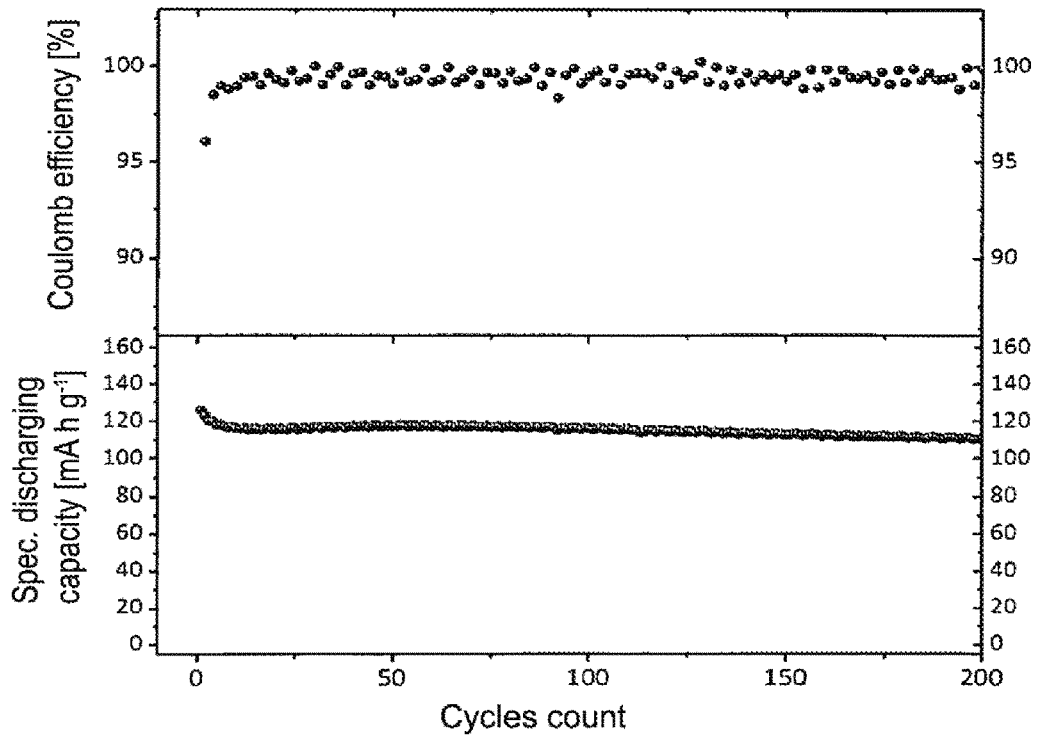
FIG. 5: test results of the cyclization of a lithium/LiFePO$_4$ battery according to an embodiment of the invention having a dry polymer electrolyte according to an embodiment of the invention.
Figure 6:
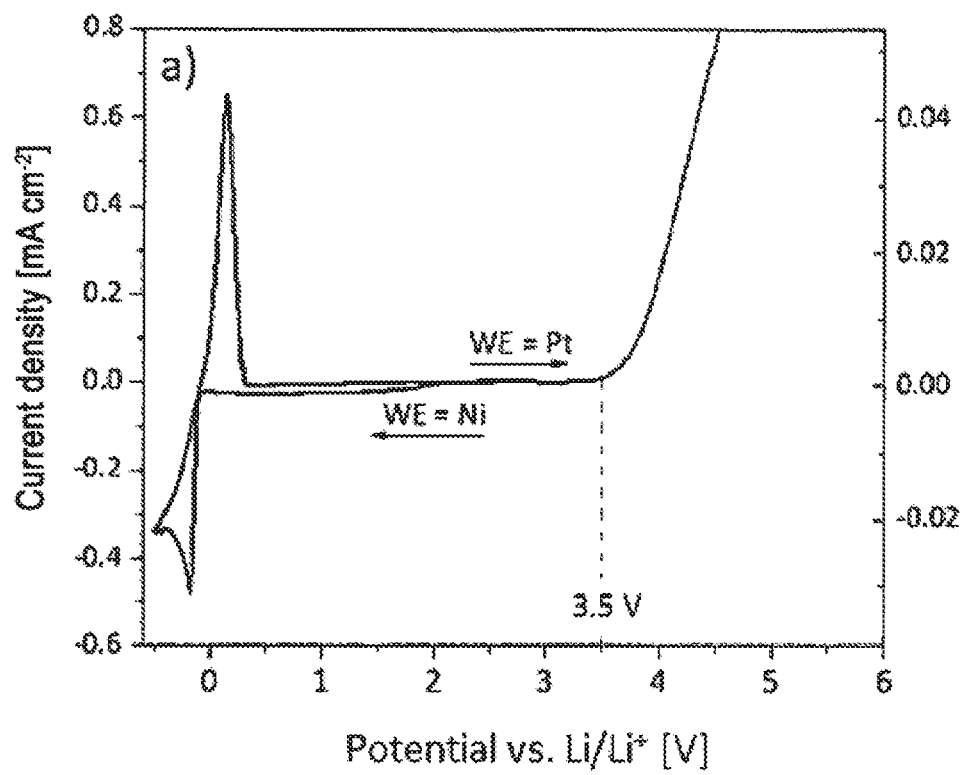
FIGS. 6 *a*) and 6 *b*): results of a test of the electrochemical stability window of a) unmodified polyrotaxanes and b) chemically modified polyrotaxanes (in the sample shown here, the hydroxyl groups of the polyrotaxane are modified with short-chain polycaprolactone ketene).
Figure 6:
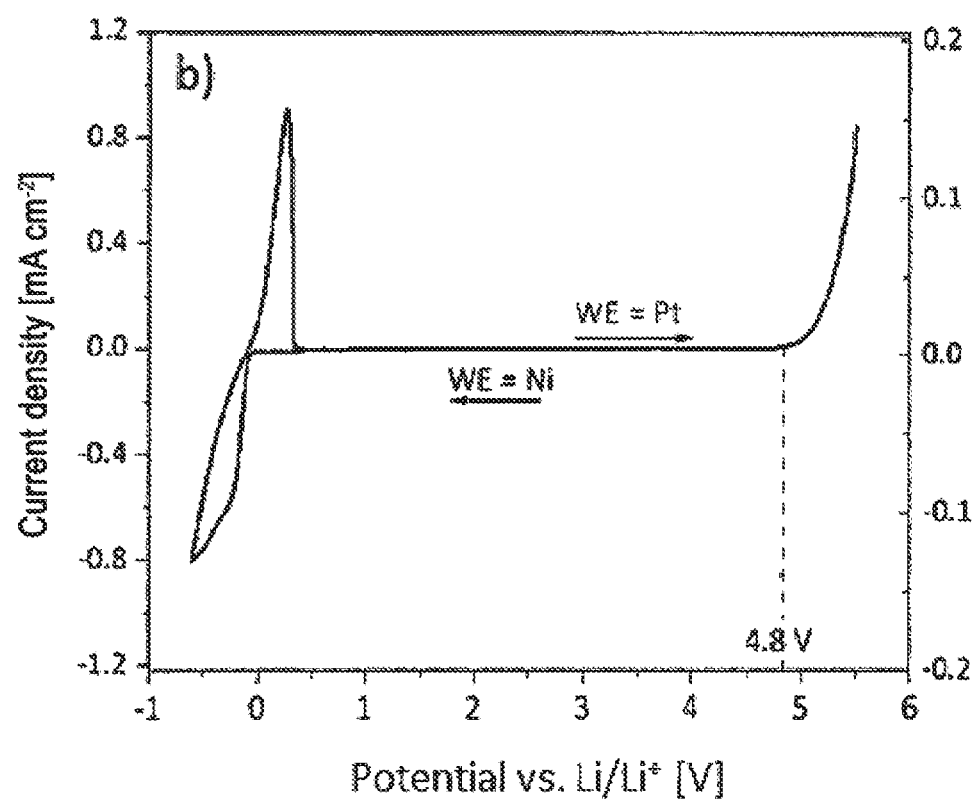

Shown are:

FIG. 1: schematic representation of the structure of a polyrotaxane:
Top: a main-chain polyrotaxane with "stoppers" at both ends,
Bottom: a side-chain polyrotaxane.
FIG. 2: modifications of cyclodextrins.
FIG. 3: comparison of the structures of an unmodified polyrotaxane (left) and a polyrotaxane modified according to an embodiment of the invention (right).
FIG. 4: conductivity measurements.
FIG. 5: test results of the cyclization of a lithium/LiFePO$_4$ battery according to an embodiment of the invention having a dry polymer electrolyte according to an embodiment of the invention.
FIG. 6: results of a test of the electrochemical stability window of a) unmodified polyrotaxanes and b) chemically modified polyrotaxanes (in the sample shown here, the hydroxyl groups of the polyrotaxane are modified with short-chain polycaprolactone ketene).

In the production of polyrotaxanes, the cyclodextrins or crown ethers are first threaded onto the linear polymer and the stoppers are added in a second step.

In the modification of the cyclodextrins or the crown ethers with alkyl, aryl, alkenyl or alkynyl groups according to certain embodiments of the invention, the modification is carried out first, and the already modified cyclodextrins or crown ethers are subsequently threaded onto the polymer. If the cyclodextrins or crown ethers are modified with short-chain polymer groups, the unmodified cyclodextrins or crown ethers are first threaded onto the polymer, and only in a further step are the polymer side groups and the stopper applied. The stoppers may in this case consist of voluminous aromatic molecules or else possess functional groups which may likewise be polymerized so that these voluminous polymer chains serve as stoppers.

Exemplary Embodiment for a Synthesis:
Methylation of Cyclodextrin

The corresponding cyclodextrin is dissolved in a solvent and the solution is cooled to 0° C. Sodium hydride is subsequently added in excess and the solution is stirred for 30 min at room temperature. Methyl iodide is slowly added in the next step, again at 0° C. Finally, the resulting product is purified and dried.

Exemplary Embodiment for a Synthesis:
Pseudo-Polyrotaxane

A saturated solution of the modified cyclodextrin is produced. Moreover, a solution of polyethylene oxide and LiTFSI (ratio of polymer repeating unit to Li salt of 5:1) is produced. Both solutions are subsequently mixed, and the resulting precipitate was separated, washed, and dried.

In order to check the improved ionic conductivity, conductivity tests were conducted on the above-described dry electrolyte according to an embodiment of the invention as well as on a reference electrolyte (i.e., an unmodified polyrotaxane).

The conductivity measurements were measured on Novocontrol with the software Windeta in a temperature range of 20° C.-100° C. and a frequency range of $2*10^7$ Hz to $1*10^{-1}$ Hz. The results are listed in Table 1. The two systems are differentiated exclusively in the modification of the hydroxyl groups of the cyclodextrin. All other parameters, such as measuring method, lithium salt content, type of cyclodextrin, are identical in both systems.

TABLE 1

|  | Ionic conductivity at $T = 25°$ C./S cm$^{-1}$ | Ionic conductivity at $T = 60°$ C./S cm$^{-1}$ |
|---|---|---|
| Polyrotaxanes with unmodified cyclodextrins | $7.1 \times 10^{-8}$ | $1.0 \times 10^{-6}$ |
| Polyrotaxanes with modified cyclodextrins | $2.2 \times 10^{-4}$ | $1.1 \times 10^{-3}$ |

For comparison, conductivities from the literature[22, 23, 24] in the range of $10^{-8}$-$10^{-9}$ S/cm at room temperature are also shown in FIG. 4.

The modified polyrotaxanes from Table 1 normally have a transference number of 0.6; the newly introduced individual ion conductors even have a transference number of 0.8.

Furthermore, studies regarding the cyclization of a lithium/LiFePO4 cell in a range of 2.5-3.8 V with a dry polymer electrolyte according to an embodiment of the invention were performed at 60° C. (see FIG. 5 in this regard). High charging and discharging rates of 1 C were set. The Coulombic efficiency (charge efficiency calculated from the ratio of charging to discharging capacity) in the first cycle was approximately 96%. Stable cyclization could be detected even at over 200 cycles. A stable cyclization in this respect is understood to mean a nearly consistent capacity with increasing cycle count.

Linear feed voltammetry may be used to determine the oxidative stability of a material. An external voltage profile relative to a reference (Li/Li$^+$) is in this case applied to the sample to be examined, and the measured current density is recorded at the counter electrode. Since charge carriers, such as electrons and ions, arise upon decomposition, the current density will increase as a result. An increase in current density accordingly indicates the decomposition of the electrolyte.

FIG. 6 shows the results of the studies regarding the electrochemical stability window for unmodified polyrotaxanes in FIG. 6 a) and for chemically modified polyrotaxanes in FIG. 6 b). Shown here are the hydroxyl groups of the polyrotaxane, modified with short-chain polycaprolactone ketene.

All systems in which the hydroxyl groups are modified exhibit advantageous stabilities up to 4.6 V vs. Li/Li$^+$, whereas unmodified systems regularly exhibit stability only up to 3.5 V vs. Li/Li$^+$.

LITERATURE CITED IN THIS APPLICATION

[1] Wen, J.; Yu, Y.; Chen, C., *Materials Express* 2012, 2 (3), 197-212.
[2] Perea, A.; Dontigny, M.; Zaghib, K., *J. Power Sources* 2017, 359, 182-185.
[3] Han, X.; Ouyang, M.; Lu, L.; Li, J.; Zheng, Y.; Li, Z., *J. Power Sources* 2014, 251, 38-54.
[4] Knauth, P., *Solid State Ionics* 2009, 180 (14), 911-916.
[5] Ma, C.; Chen, K.; Liang, C.; Nan, C.-W.; Ishikawa, R.; More, K.; Chi, M., *Energy & Environmental Science* 2014, 7 (5), 1638-1642.
[6] Xue, Z.; He, D.; Xie, X., *J. Mater. Chem. A* 2015, 3 (38), 19218-19253.
[7] Münchow, V.; Di Noto, V.; Tondello, E., *Electrochim. Acta* 2000, 45 (8), 1211-1221.
[8] Tanaka, R.; Sakurai, M.; Sekiguchi, H.; Mori, H.; Murayama, T.; Ooyama, T., *Electrochim. Acta* 2001, 46 (10), 1709-1715.
[9] Zhao, Y.; Wu, C.; Peng, G.; Chen, X.; Yao, X.; Bai, Y.; Wu, F.; Chen, S.; Xu, X., *J. Power Sources* 2016, 301, 47-53.
[10] He, W.; Cui, Z.; Liu, X.; Cui, Y.; Chai, J.; Zhou, X.; Liu, Z.; Cui, G., *Electrochim. Acta* 2017, 225, 151-159.
[11] Mindemark, J.; Imholt, L.; Montero, J.; Brandell, D., *Journal of Polymer Science Part A: Polymer Chemistry* 2016, 54 (14), 2128-2135.
[12] Kaskhedikar, N.; Burjanadze, M.; Karatas, Y.; Wiemhöfer, H. D., *Solid State Ionics* 2006,177 (35), 3129-3134.
[13] Yue, L.; Ma, J.; Zhang, J.; Zhao, J.; Dong, S.; Liu, Z.; Cui, G.; Chen, L., *Energy Storage Materials* 2016, 5, 139-164.
[14] Osada, I.; de Vries, H.; Scrosati, B.; Passerini, S., *Angew. Chem. Int. Ed.* 2016, 55 (2), 500-513.
[15] Karuppasamy, K.; Prasanna, K.; Kim, D.; Kang, Y. H.; Rhee, H. W., *RSC Advances* 2017, 7 (31), 19211-19222.
[16] Liu, M.; Zhou, D.; He, Y.-B.; Fu, Y.; Qin, X.; Miao, C.; Du, H.; Li, B.; Yang, Q.-H.; Lin, Z.; Zhao, T. S.; Kang, F., *Nano Energy* 2016, 22, 278-289.
[17] Jankowsky, S.; Hiller, M. M.; Fromm, 0.; Winter, M.; Wiemhöfer, H. D., *Electrochim. Acta* 2015, 155, 364-371.
[18] Karuppasamy, K.; Reddy, P. A.; Srinivas, G.; Tewari, A.; Sharma, R.; Shajan, X. S.; Gupta, D., *Journal of Membrane Science* 2016, 514, 350-357.
[19] Shim, J.; Kim, L.; Kim, H. J.; Jeong, D.; Lee, J. H.; Lee, J.-C., *Polymer* 2017, 122, 222-231.
[20] Ben youcef, H.; Garcia-Calvo, O.; Lago, N.; Devaraj, S.; Armand, M., *Electrochim. Acta* 2016, 220, 587-594.
[21] Zhang, J.; Zhao, N.; Zhang, M.; Li, V.; Chu, P. K.; Guo, X.; Di, Z.; Wang, X.; Li, H., *Nano Energy* 2016, 28, 447-454.
[22] Yang, L. Y.; Wei, D. X.; Xu, M.; Yao, Y. F.; Chen, Q., *Angew Chem Int Ed Engl* 2014, 53 (14), 3631-5.
[23] Yang, L. Y.; Fu, X. B.; Chen, T. Q.; Pan, L. K.; Ji, P.; Yao, Y. F.; Chen, Q., *Chemistry* 2015, 21 (17), 6346-9.
[24] Fu, X.-B.; Yang, L.-Y.; Ma, J.-Q.; Yang, G.; Yao, Y.-F.; Chen, Q., *Polymer* 2016, 105, 310-317.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A solvent-free polymer electrolyte for use in a rechargeable lithium-ion secondary battery, comprising:
a polymer matrix which is conductive for lithium ions and a lithium salt, wherein the polymer matrix has at least one pseudo-polyrotaxane which comprises at least one linear polymer and at least one ring-shaped molecule, and wherein the lithium salt is arranged in the polymer matrix and is at least partially chemically bonded to the polymer matrix,
wherein
the polymer matrix comprises at least one pseudo-polyrotaxane with
at least one completely or partially chemically modified cyclodextrin in which the present hydroxyl groups of the cyclodextrin are partly or completely modified by functional groups, or
at least one completely or partially chemically modified crown ether in which the scaffold of the crown ether is partially or completely modified by functional groups,
wherein the functional groups comprise alkyl, aryl, alkenyl, alkynyl groups ($C_n$, with $n \leq 5$), or other short-chain polymer groups having up to 20 repeating units.

2. The polymer electrolyte according to claim 1, wherein the pseudo-polyrotaxane of the polymer matrix comprises a polyethylene oxide as a linear polymer.

3. The polymer electrolyte according to claim 1, wherein the pseudo-polyrotaxane of the polymer matrix has a linear polymer having a molecular weight between 500 and 10,000 g/mol.

4. The polymer electrolyte according to claim 1, wherein the polymer electrolyte has an ionic conductivity of at least $10^{-4}$ S/cm at 25° C.

5. The polymer electrolyte according to claim 1, wherein the polymer electrolyte comprises at least one additional additive having a weight fraction of 1 to 5% by weight relative to the weight of the polyrotaxane, said additive being selected from the group consisting of poly(ethylene oxide) (PEO), poly(propylene oxide) (PPO), poly(acrylonitrile) (PAN), poly(methyl methacrylate) (PMMA), poly(vinylidene difluoride) (PVDF), polyvinyl chloride, polydimethylsiloxane, and poly(vinylidene difluoride) hexafluoropropylene (PVDF-HFP), a derivative thereof, and any combination of these additives.

6. The polymer electrolyte according to claim 1, wherein the polymer electrolyte comprises a lithium salt selected from the group consisting of lithium perchlorate, $LiClO_4$; lithium hexafluorophosphate, $LiPF_6$; lithium tetrafluoroborate, $LiBF_4$; lithium hexafluoroarsenate(V), $LiAsF_6$; lithium trifluoromethanesulfonate, $LiCF_3SO_3$; lithium bis-trifluoromethyl sulfonylimide, $LiN(CF_3SO_2)_2$; lithium bis(oxalato)borate, LiBOB; lithium oxalyldifluoroborate, $LiBF_2C_2O_4$; lithium nitrate, $LiNO_3$; Li-fluoroalkyl phosphate, $LiPF_3(CF_2CF_3)_3$; lithium bisperfluoroethysulfonylimide, LiBETI; lithium bis(trifluoromethanesulphonyl)imide; lithium bis(fluorosulphonyl)imide; lithium trifluoromethanesulfonimide, LiTFSI; and any combination of these salts.

7. A polymer electrolyte according to claim 1, wherein at least some ends of the linear polymer are modified by bulky, voluminous groups.

8. A lithium secondary battery comprising an anode, a cathode, and a dry, solvent-free polymer electrolyte according to claim 1.

9. The lithium secondary battery according to claim 8, comprising a lithium-ion battery, a rechargeable lithium metal battery, a lithium sulfur or lithium air battery, an alkali metal or alkaline earth metal battery, or an aluminum metal battery.

10. The lithium secondary battery according to claim 8, wherein the lithium secondary battery has a rapid charging capability at rates of at least 1 C.

11. The lithium secondary battery according to claim 8, wherein the lithium secondary battery exhibits stable long-term cyclization with specific capacities of at least 110 mAh/g over at least 200 cycles at charging and discharging currents of at least 1 C.

12. The lithium secondary battery according to claim 8, wherein the lithium secondary battery has a Coulombic efficiency of at least 96% in the first charge/discharge cycle.

* * * * *